Dec. 30, 1930.                F. HENRARD                1,787,311

SEPARATING MACHINE FOR MILK

Filed Oct. 4, 1929

Inventor:
Fernand Henrard
By [signature]
Attorney

Patented Dec. 30, 1930

1,787,311

UNITED STATES PATENT OFFICE

FERNAND HENRARD, OF BRUSSELS, BELGIUM, ASSIGNOR TO ECREMEUSES MELOTTE, SOCIETE ANONYME, OF REMICOURT, BELGIUM

SEPARATING MACHINE FOR MILK

Application filed October 4, 1929, Serial No. 397,284, and in Belgium April 11, 1929.

The present invention relates to certain parts of a separating machine and in particular to the upper milk reservoir and the casing of the bowl of the turbine.

One of the objects of the invention is to improve the form and the construction of the above-mentioned reservoirs while permitting a separating machine occupying a smaller amount of space to be constructed and the various members to be cleaned with greater ease.

For this purpose the invention provides for the upper milk reservoir to be formed in a single piece with the casing of a speed-multiplying device situated between the driving shaft of the separator and the bowl of the turbine.

The said milk reservoir is made of rectangular shape with the walls connected by large concave mouldings, one of the angles of which walls is occupied by the said casing.

Another object of the invention is to permit the bowl to be removed from its container without it being necessary to open the latter. In known arrangement, the said container is generally made in two parts, one of which is fixed with reference to the frame and the other of which is removable.

Such an arrangement necessitates the provision of more or less effective joints. According to the invention and with the object of removing this disadvantage, the container is formed in a single piece which is adapted to pivot about a shaft rigid with the frame of the separating machine and external to the container, the upper aperture in the container being such as to permit the passage of the bowl during the pivoting of the container.

The accompanying drawings illustrate by way of example and in a non-limiting manner, one form of construction of the invention. The latter also resides in the various features which the arrangement illustrated comprises.

Figure 1:
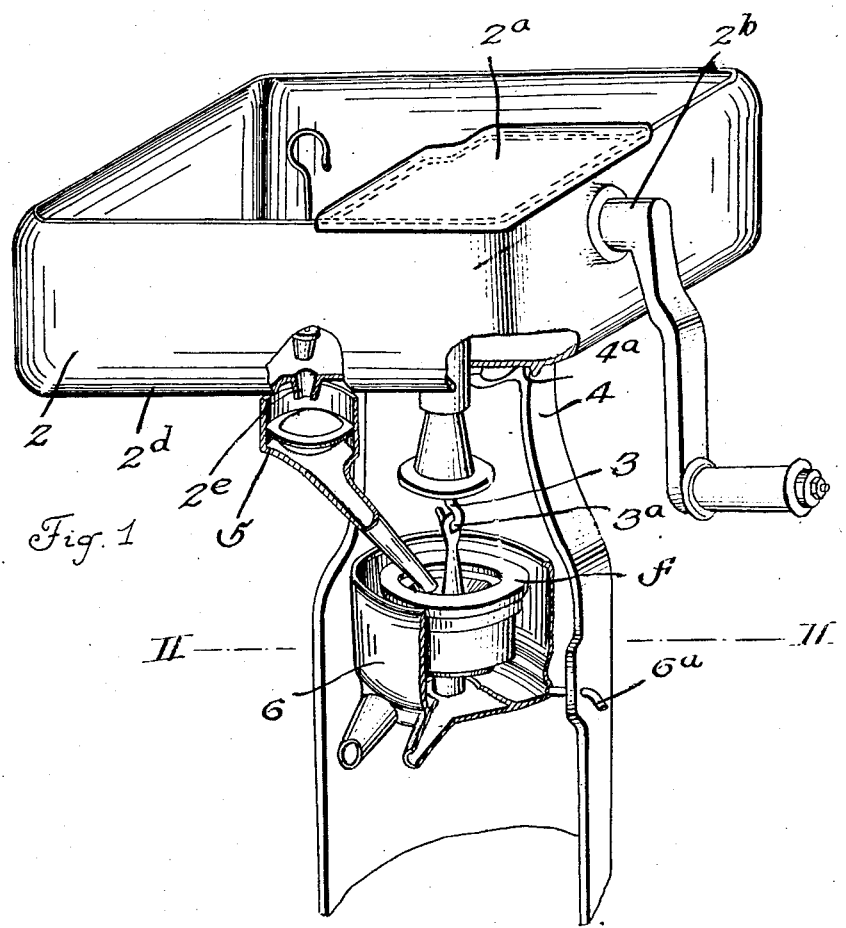
Figure 1 is a general view of a separating machine, certain parts of which are constructed according to the invention.
Figure 2:
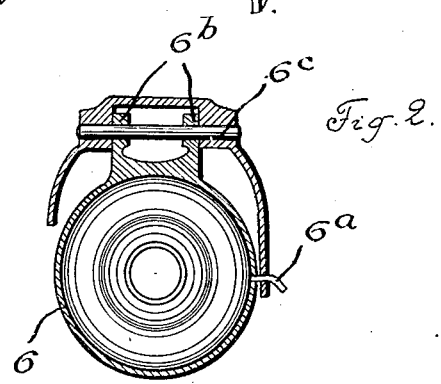
Figure 2 is a section taken along the line II—II in Figure 1.

The upper milk reservoir 2, of rectangular shape, the walls of which are connected by concave mouldings, is cast with the casing 2a of a speed transmission gearing device situated between the driving shaft 2b and the shaft 3 of the bowl.

This reservoir 2 is supported by the frame 4 of the separator.

The base 2d of said reservoir is inclined towards an outlet duct 2c which may be closed, and which overlies an intermediate float reservoir 5 which performs its normal function.

The container 6 for the bowl 7 of the turbine is supported in its working position on the one hand by a spindle 6a passing through the frame 4 and engaging in a suitable notch provided in the container 6 and on the other hand by lugs 6b rigid with the said container and engaging about a shaft 6c rigid with the frame and about which the container is adapted to pivot.

In order to remove the bowl 7 the spindle 6a is disengaged and the container 6 is swung about its shaft 6c. The open upper end of the said container is such that this pivotal movement can take place and leave the bowl approximately in its normal position.

This pivotal movement of the container has the effect of disengaging the bowl, and the latter can then be removed by lifting and partly swinging it about the hook 3a which supports it.

What I claim is:

1. In a separating machine, a milk reservoir, a rotatable bowl, a casing to contain a speed-multiplying device disposed within and formed in one piece with said reservoir, a shaft for driving said speed-multiplying device, a transmission device for connecting the speed-multiplying device with the bowl to rotate the latter, and means for delivering milk from the reservoir to the bowl.

2. In a separating machine, a rectangular milk reservoir having large concave mouldings at its corners, a rotatable bowl, a casing to contain a speed-multiplying device disposed in one of the corners of said reservoir and formed in one piece with the same, a shaft for driving said speed-multiplying device, a transmission device for connecting the speed-multiplying device with the bowl to rotate the latter, and means for delivering milk from the reservoir to the bowl.

3. In a separating machine, a frame, a bowl, a one-piece container for the bowl, and a shaft rigid with the frame and about which said container is pivoted, said shaft being disposed externally with respect to the container.

4. In a separating machine, a frame, a bowl, a one-piece container for the bowl provided with a pair of external apertured lugs, and a horizontal shaft rigid with the frame and about which said container is pivoted, said shaft passing through said lugs.

5. A separating machine, according to claim 14, in which a suspension system is provided for the bowl, and the container for said bowl has an aperture such that it permits the passage of the bowl therethrough during the pivoting of the container, whereupon the bowl may be removed by partly swinging it about its suspension system.

In testimony whereof I have affixed my signature.

FERNAND HENRARD.